April 18, 1939.  I. A. LESLIE  2,154,906

HYDRAULIC SHOCK DAMPER

Filed Aug. 7, 1936

Inventor
IVAN ALEXANDER LESLIE
By [signature]
Attorney.

Patented Apr. 18, 1939

2,154,906

UNITED STATES PATENT OFFICE 2,154,906

HYDRAULIC SHOCK DAMPER

Ivan Alexander Leslie, Highfield Lawn, Highfield Road, Derby, England, assignor to Rolls-Royce Limited, Derby, England Application August 7, 1936, Serial No. 94,815
In Great Britain August 12, 1935

6 Claims. (Cl. 188—88)

This invention is for improvements in hydraulic shock dampers for vehicles and in particular for automobiles.

When an automobile is suddenly braked various disadvantages may occur. The first is the phenomenon known as "front wheel tramp" in which a see-sawing movement of the front wheels takes place about the centre of the axle. The second phenomenon is that known as "front wheel patter" the wheels bouncing along on the ground. The third phenomenon is that the application of the brakes to the wheels causes the body which is situated above the wheels and connected to the axles by springs to attempt to move forward with reference to the chassis owing to the momentum with which it is charged and this results in more weight being thrown on to the front wheels and the front of the car dipping, producing an uncomfortable sensation to the passengers in the car, especially those occupying the rear seats. Furthermore the effect may be to cause the wheels of the car temporarily to leave the road. The reverse of this last mentioned phenomenon may be experienced when the clutch is engaged too suddenly and the wheels jerked forward.

It is known that the effect of these phenomena may be largely reduced if the shock dampers, and particularly the front shock dampers are momentarily stiffened.

Thus to prevent the wheels leaving the road on sudden braking it is desirable to stiffen the dampers and particularly the front dampers on bump movement although they may be left unstiffened on rebound movement. To prevent discomfort to the passengers in the rear of the car it may also be desirable to stiffen the rear bumpers on rebound. To overcome the reverse phenomenon, namely, the rearward pitching of the car on sudden acceleration caused by engaging the clutch too suddenly, it will be desirable to stiffen the front dampers on the rebound movement and the rear dampers on the bump movement.

This invention is for a new way of employing a weighted mass displaced through its own inertia to cause stiffening of a hydraulic shock damper.

According to this invention I provide a hydraulic shock damper of a road vehicle in which on displacement of a road wheel with reference to the vehicle liquid is forced through a passageway controlled by a spring loaded valve and in which on a sudden change of vehicle momentum the resistance of the valve to the displacement of the fluid is increased, however without increasing the resistance of the valve spring, by a weighted mass displaced through its own inertia in a direction corresponding to the direction of travel of the vehicle on the change of momentum taking place.

By this means I am able to employ either a spring which abuts against a fixed part or a spring which abuts against a member which can be moved as is known to vary the resistance of the spring in dependence on other circumstances, and I can at the same time increase the valve loading by the inertia mass without interfering with these other arrangements. The valve may consist of two members normally displaced together by a pressure of liquid on each of them, one of which is free to move without the other, and the weighted mass when displaced may operate to hold this other member against displacement and to reduce the effective area, on which the liquid operates to displace the valve.

In another form the weighted mass may cause a second spring to bear on the valve, thus increasing its resistance.

The damper may be stiffened on bump movement or on rebound movement or on both in accordance with which disadvantage, as before described, it is desired to guard against. The weighted means may be arranged to be displaced on sudden acceleration of the vehicle or on sudden deceleration of the vehicle or on both.

In using the expression "in a direction corresponding to the direction of travel of the vehicle" I mean that the weighted mass will be moved forward with reference to the direction of travel of the vehicle if caused to operate on sudden deceleration, and rearwardly, that is in a direction reverse to that of the travel of the vehicle, if set to operate on sudden acceleration, but for convenience throughout this specification I use the phrase "corresponding to the direction of travel of the vehicle" to include either of these directions.

The weighted means may be conveniently formed as a pendulum to swing about a horizontal fulcrum. Means may be incorporated to prevent the weighted means acting unless the change of momentum is sudden.

In speaking throughout this specification of a "shock damper" I mean an apparatus by which the movement of a spring by which the wheel is resiliently mounted on a chassis frame, is resisted.

I mean by "bump movement" movement of the wheel towards the chassis frame and the consequential movement of the shock damper parts and by "rebound movement" movement of the wheel away from the chassis frame and the consequential movement of the shock damper parts.

Examples of this invention are illustrated diagrammatically in the accompanying drawing.

Figure 1:
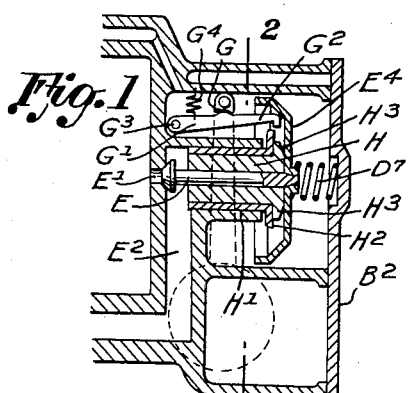
Figure 1 is a vertical section of a shock damper regulating valve and Figure 2 is a section on the line 2—2 of Figure 1.
Figure 2:
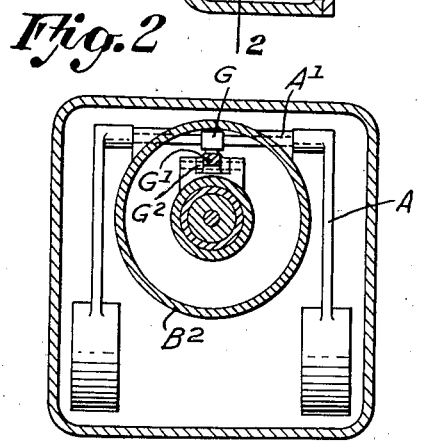
Figure 5:
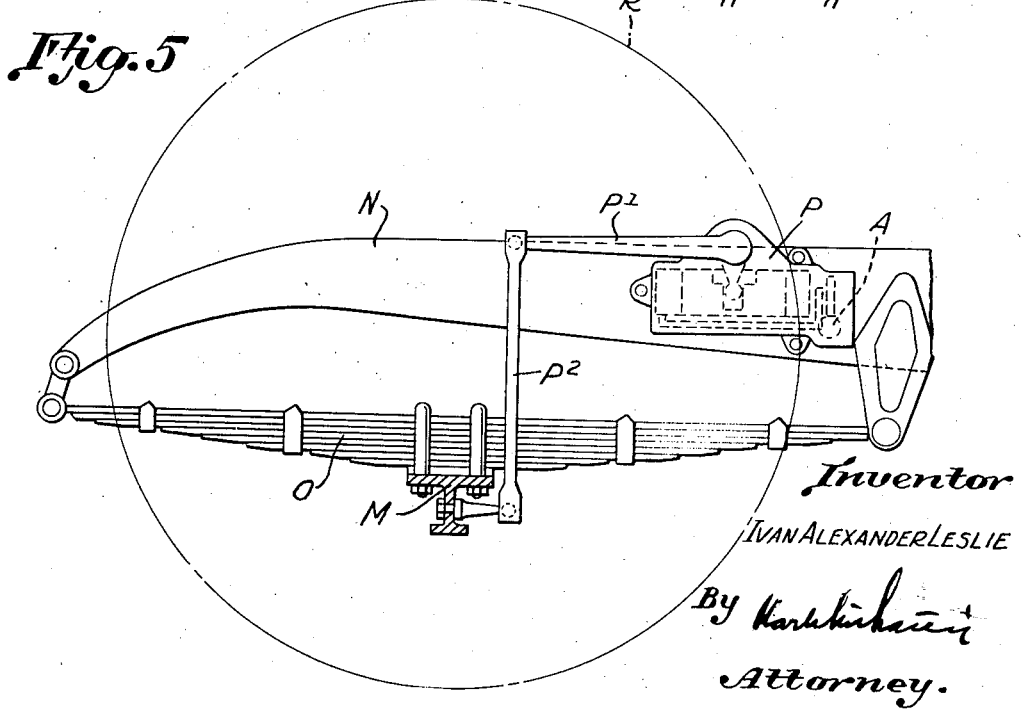
Fig. 5 is an elevation showing the mounting of the shock absorber relative to a vehicle wheel.

Referring to the drawing, P is the shock absorber mounted on the frame N of the vehicle (Fig. 5) and operated by an arm $P^1$ and a rod $P^2$ secured to the cross member M which is carried from the vehicle frame N by the usual leaf spring O. A is a pendulum fulcrumed at $A^1$ and formed as shown as a stirrup member with weights at the end of its arms (Figs. 1 and 2). On the member which joins the arms of the stirrup is formed a cam G. This cam cooperates with a boss or projection $G^1$ on a pawl $G^2$ fulcrumed at $G^3$. E is the valve controlling the transfer passageway $E^1$—$E^2$ between the shock damper chambers of a double ended piston shock damper of known type.

Pressure in the conduit $E^1$ lifts the valve E directly by pressure on its end, pressure in the conduit $E^2$ lifts the valve by pressure on sleeves H and $H^1$, which can slide together on the valve stem and react against a diaphragm member $E^4$ rigidly mounted on the end of the valve stem. Pressure in either case therefore will lift the valve against the reaction of spring $D^7$. Valve flutter is damped out by the diaphragm $E^4$ rigid with the valve stem.

The outer sleeve member $H^1$ can slide on the sleeve member H.

Sleeve $H^1$ has an outwardly extending flange $H^2$ which is adapted to be clutched by pawl $G^2$ if the latter is depressed. A spring $G^4$ normally holds pawl $G^2$ in the position shown in the drawings in which case the end of the pawl will not catch flange $H^2$ on member $H^1$. If, however, the pendulum is displaced in either direction sufficiently the cam G will depress pawl $G^2$ to catch flange $H^2$. Normally pressure in conduit $E^2$ acting on the end of member H and on the end of member $H^1$ which reacts against a shoulder $H^3$ on member H acts to lift the valve when the shock damper piston is moved toward the end of the cylinder which is in communication with conduit $E^2$. When, however, member $H^1$ is held from movement by pawl $G^2$ catching in flange $H^2$ only the pressure on the end of member H is effective to raise the valve and this being a smaller area proportionately greater pressure is required.

Figure 3:
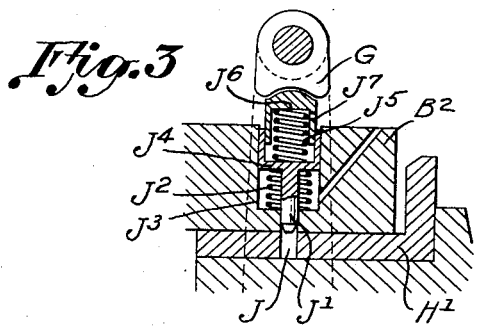
Figure 3 is a view, on an enlarged scale, of an alternating arrangement to that illustrated in Figure 1

Figure 3 shows an alternative method of enabling pendulum operated cam G to hold sleeve $H^1$. In this case sleeve $H^1$ has a hole or slot J which is adapted to be engaged by a pin $J^1$ and to be held against movement for the like object as described with reference to Figure 1. Pin $J^1$ is normally held up by a spring $J^2$ which reacts between the bottom of a cylinder $J^3$ in the shock damper casing $B^2$ and a flange $J^4$ on pin $J^1$. On top of this flange is another spring $J^5$ the other end of which reacts against a cap member $J^6$ which is in contact with the cam G. Gentle movements of cam G will merely cause cap $J^6$ to compress spring $J^5$ which is weaker than spring $J^2$, and the cap will move toward the flange $J^4$ expelling air through hole $J^7$, but on sudden movements, air will not escape quickly enough from hole $J^7$ and as a result pin $J^1$ will be moved down against the reaction of spring $J^2$ to engage in slot J and hold member $H^1$ from displacement.

Figure 4:
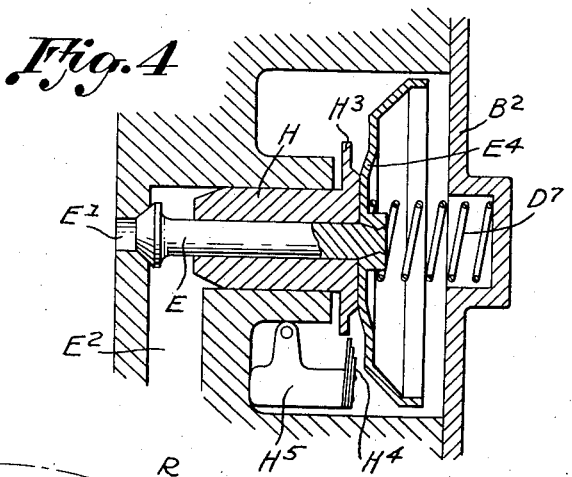
Figure 4 is a view, also on an enlarged scale to Figures 1 and 2, of a third form of this invention.

In Figure 4 an alternative arrangement to that shown in Figure 3 is illustrated in which the division of the member H, $H^1$ is avoided. In this case the member H has a flange $H^3$ which on sudden deceleration of the vehicle is engaged by a leaf spring $H^4$ carried by a pendulum $H^5$ mounted inside the shock damper casing. In this case the displacement of the pendulum will cause the leaf spring to bear on member H and resist the opening of the valve the resistance of the leaf spring being added to that of the coil spring $D^7$, which normally opposes such opening.

What I claim is:

1. A hydraulic shock damper for vehicles having wheels mounted on a frame through springs the movement of which springs is resisted by shock dampers, which shock damper comprises a passageway through which on displacement of the wheel liquid is caused to flow past a valve in such passageway resisting the flow of liquid, a spring loading said valve, a weighted means which is displaced through its own inertia in a direction corresponding to the direction of travel of the vehicle on a sudden change of vehicle momentum taking place, and a connection between the weighted means and the said valve which causes the resistance of the valve to the flow of liquid to be increased, while leaving the resistance of said valve spring unaffected when such displacement takes place.

2. A hydraulic shock damper for vehicles having wheels mounted on a frame through springs, the movement of which springs is resisted by shock dampers, which shock damper comprises a passageway through which on displacement of the wheel liquid is caused to flow past a valve in such passageway which resists the flow of liquid, resilient means which urge the valve to close, this closing pressure being overcome by hydraulic pressure on a member divided into two parts, a weighted means which is displaced through its own inertia in a direction corresponding to the direction of travel of the vehicle on a sudden change of vehicle momentum taking place and a connection between the weighted means and one of such parts, to hold such one part from displacement and accordingly increase the hydraulic pressure necessary to overcome the resistance of the valve spring and the resistance of the damper to movement of the wheel spring.

3. A hydraulic shock damper as claimed in claim 1 in combination with means adapted to prevent an increase of shock damper resistance by said weighted means unless the change of momentum is sudden.

4. A hydraulic shock damper as claimed in claim 1, in which the connection including a lost motion device comprises a member, two springs holding said member between them, a closed chamber enclosing the weaker one of said springs and a gauged release for a fluid from said chamber so that on slow movements of said weighted means said member will not be displaced, but that on sudden movements of said weighted means said member is displaced to cause the damper loading to be increased.

5. A hydraulic shock damper as claimed in claim 1 in combination with a second spring and means for causing said second spring to load said valve upon the action of said weighted means.

6. A hydraulic shock damper as claimed in claim 1, in which the weighted means include a pendulum and a leaf spring carried by said pendulum so as to bear, on displacement of said pendulum, on the valve to increase the loading thereon.

IVAN ALEXANDER LESLIE.